July 9, 1963 H. T. PEHR 3,096,910
COMBINED SALT AND PEPPER DISPENSER
Filed Oct. 20, 1960

INVENTOR.
Harold T. Pehr
BY
ATTORNEY.

United States Patent Office 3,096,910
Patented July 9, 1963

3,096,910
COMBINED SALT AND PEPPER DISPENSER
Harold T. Pehr, 637 E. 72nd Terrace, Kansas City, Mo.
Filed Oct. 20, 1960, Ser. No. 63,830
4 Claims. (Cl. 222—142.5)

This invention relates to combination salt and pepper shakers and has particular relation to that type of shaker in which either salt or pepper may be dispensed without discharging the other, or a mixture of both condiments may be dispensed at one time.

One object of this invention is to provide a device of this character in which by manual adjustment either salt or pepper, or a mixture of both, may be dispensed, or the device may be closed against the discharge of either condiment.

Another object is to provide a device of this character of very simple construction and having few moving parts.

Another object is to provide such a device which can be easily refilled.

These and other objects will be apparent from the following specifications and drawings in which.

Figure 1:
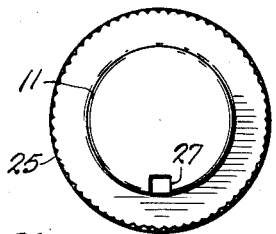
FIGURE 1 is a top plan view of a preferred embodiment of the invention.

Referring to the drawings by reference numerals, the device comprises a cylindrical container 10 and a cap 11, both composed of a flexible plastic or similar material. Container 10 is closed at its base 12, is open at its top and has an outer cylindrical wall 13. It is divided into an outer salt compartment 14 and an inner pepper compartment 15 by means of an inner cylindrical partition 16, which is co-axial with outer wall 13. Inner partition 16 is somewhat longer than outer wall 13, so that a small portion of partition 16 extends above the upper rim of wall 13. Outer wall 13 has spaced apart salt dispensing apertures 17 and 18 adjacent its upper rim. Inner partition 16 has spaced apart pepper dispensing apertures 19 and 20 at its upper rim. Pepper dispensing aperture 20 is radially in line with salt dispensing aperture 18, but is of such a depth that its lowest point is above the upper rim of outer wall 13.

Cap 11 has an outer cylindrical wall 21 and an inner downward depending cylindrical flange 22. Extending downward from outer wall 21 there is a cylindrical, downward depending flange 23 of a thickness such as to plug salt compartment 14. Between outer wall 21 and flange 23, cap 11 widens to form a shoulder 24, which rests upon outer wall 13 of container 10. Shoulder 24 has vertical knurlings along its outer rim 25, for ease of gripping in rotating cap 11 in relation to container 10. Inner flange 22 has an outer diameter equal to the diameter of pepper compartment 15, so that when cap 11 is pressed down into container 10, inner flange 22 serves to plug pepper compartment 15 and outer flange 23 serves to plug salt compartment 14.

Figure 3:
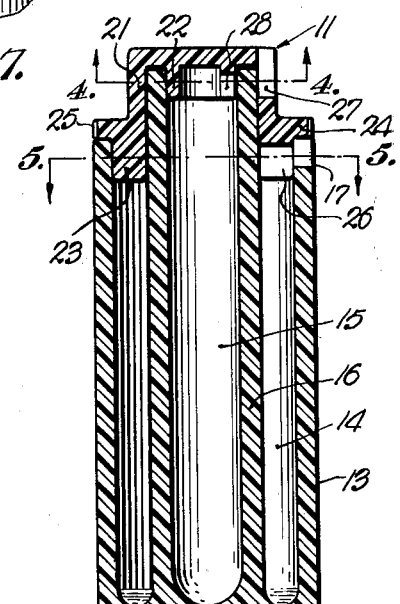
FIGURE 3 is a central vertical section taken on the line 3—3 of FIGURE 2.
Figure 5:
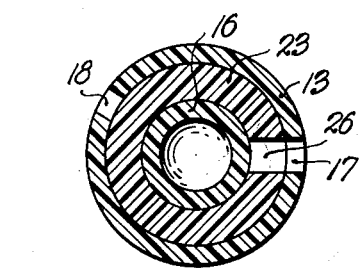
FIGURE 5 is a horizontal section taken on line 5—5 of FIGURE 3.

Outer flange 23 in cap wall 21 contains a salt dispensing slot 26 extending from its lower rim, upward to a point so as to register with aperture 17, when cap is in place and rotated into salt dispensing position, as best shown in FIGURES 3 and 5. The upper portion of cap wall 21 has a pepper dispensing slot 27 in vertical alignment with slot 26 and extending from the top of cap 11 downward to a point in line with the lower rim of inner flange 22. Inner flange 22 has a single pepper dispensing slot 28 extending upward from its lower edge and in radial alignment with slot 27.

The dimensioning of cap 11 and container 10 are such as to cause a friction fit between the two parts, yet permitting container and cap to be rotated with relation to each other, with the aid of knurled rim 25.

As will be further explained, container 10 can be rotated with reference to cap 11 into selected positions so that only salt may be dispensed, only pepper may be dispensed, a mixture of both may be dispensed, or the device may be closed against loss of either condiment.

Figure 2:
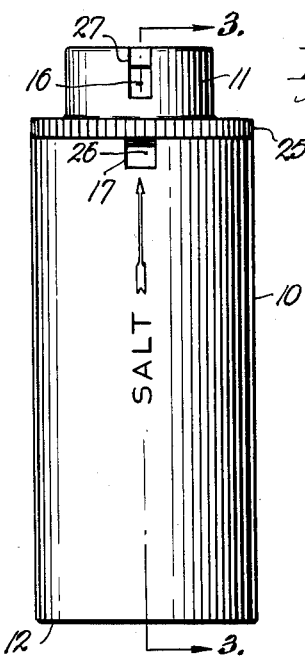
FIGURE 2 is a side elevation of the assembled shaker with the cap and container in position to dispense salt.

As best shown in FIGURES 3 and 5, when container 10 is rotated with reference to cap 11 so that salt dispensing aperture 17 in outer wall 13 lines up with slot 26 in outer flange 23 of cap, there is a continuous channel through which salt may be dispensed from compartment 14. This position is reached by rotation until aperture 17, also indicated by an arrow designated "Salt" on outer wall 13, as seen in FIGURE 2, lines up with slot 27 in cap 11. In this position it will be noted that salt dispensing aperture 18 is blocked as best shown by FIGURE 5. Likewise, both of pepper apertures 19 and 20 are blocked.

Figure 4:
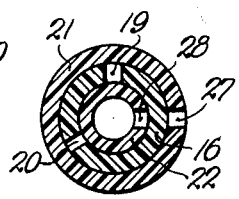
FIGURE 4 is a horizontal section taken on the line 4—4 of FIGURE 3.
Figure 6:
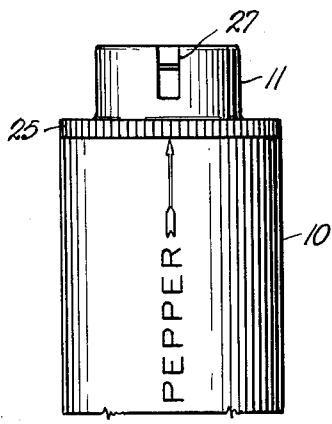
FIGURE 6 is a side elevation of the assembled shaker with container and cap in rotated position so as to dispense pepper.

One dispenses only pepper by rotating container 10 90° counter-clockwise (looking downward) with relation to cap 11, from the salt dispensing position shown in FIGURES 4 and 5. It will be seen that in the new position slots 27 and 28 in cap 10 line up with pepper dispensing aperture 19, forming a continuous channel through which pepper may pour from compartment 15. In this position pepper aperture 20 is blocked. Container is now in the position shown in FIGURE 6 where the arrow designated "Pepper" on the outer wall 13 of container 10 lines up with slot 27 in cap 11. As can be best seen by reference to FIGURE 5 which shows the salt dispensing position, a 90° counter-clockwise rotation of container to the pepper dispensing position blocks both salt dispensing apertures 17 and 18.

Figure 7:
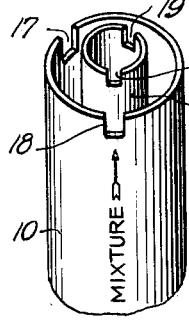
FIGURE 7 is a perspective view of the container without the cap, rotated so that the apertures for dispensing a mixture of salt and pepper are in front.

To dispense a mixture of salt and pepper one rotates container 10 clockwise about 150° with relation to cap 11, from the salt dispensing position shown in FIGURES 4 and 5. In this position slots 27 and 28 in cap 11 line up with pepper aperture 20, forming a continuous channel through which pepper flows from compartment 15, as best shown by reference to FIGURE 4. Now referring to FIGURE 5, it will be seen that with the 150° rotation clockwise, salt dispensing aperture 18 lines up with slot 26 forming a channel through which salt may flow from compartment 14. Since pepper aperture 20 and salt aperture 18 are adjacent each other, as seen in FIGURE 7, in this position salt and pepper will be simultaneously dispensed from the container.

From an examination of the drawings and particularly FIGURES 4 and 5 it will be apparent that to seal the container against discharge of either salt, pepper or a mixture, it is simply necessary to rotate cap 11 into any position other than the three previously described, so that none of the apertures in the container line up with any of the slots in the cap. In such position the friction contact between cap 11 and container 10 is such that there can be no leakage of either condiment.

Rotation of cap 11 relative to container 10 is expedited by use of knurled rim 25. Because of the relatively small size of the container and the necessity of a good friction fit, the knurlings are greatly helpful in gripping and rotating cap 11.

To fill container, cap 11 is easily removed by holding container 10 in one hand and grasping cap 11 by knurled rim 25 with the fingers and twisting cap 11 relative to container 10, while at the same time pulling the two apart. The two compartments 14 and 15 are then filled with the appropriate condiments and cap is replaced with a reverse action to that of removal.

It will be obvious that other condiments or granular substances may be dispensed through my device.

Although I have described a preferred embodiment of my invention, it is also capable of other modifications which are encompassed within the scope thereof. For example inner compartment 15 may be divided by a vertical partition extending diametrically through its axis, thereby forming more than one inner compartment. By adding other dispensing apertures in inner partition 16 and additional slots in inner flange 22 and outer wall 21 of cap, thereby more than one condiment may be selectively dispensed from the inner compartments. Similarly radial partitions could be added dividing outer compartment 14 into two or more separate compartments and by adding additional slots in cap 11 and apertures in outer container wall 13, a plurality of condiments may be selectively dispensed from outer compartment 14.

A further modification within the scope of my invention involves forming more compartments by adding further concentric partitions to container 10, each of such partitions extending higher than the partitions outward of it. By similarly modifying the cap, i.e. by addition of further concentric flanges each of such additional compartments may be sealed by such flanges and opened to dispensing position by the addition of appropriate apertures in the compartment wall adapted to line up with slots in the appropriate cap flange. It will be necessary as such additional compartments are added to modify cap 11 by adding successively narrowing outer walls, as the cap extends upward, forming a series of chambers in cap to accommodate the additional compartments in container.

In the conventional combined salt and pepper shaker there is a perforated top to the container which is then selectively opened and closed by means of the rotating cap. This necessitates that either the perforated top be removable, for filling purposes, or that container have a removable bottom piece or other means for filling. Thus it will be apparent that either way, the shaker requires a minimum of three separate parts. My device, by positioning the dispensing apertures at the sides, rather than the top of the cap, permits the elimination of one part, reducing the device to only two simple parts. This results in ease and simplicity of manufacture, reduction of material cost and in the use of the device simplifies its use and cleaning.

Having thus described my invention, I claim:

1. A combined salt and pepper shaker comprising a vertical cylindrical container open at its top and a removable cap engaging and closing said container; said container being divided into an inner compartment and an outer compartment by means of a vertical cylindrical partition concentric with the outer wall of said container, said partition extending higher than said container outer wall; both said partition and said outer wall being provided with dispensing apertures adjacent the upper edges thereof and said cap being provided with vertical flanges engaging said partition and said outer wall; each of said flanges being provided with openings so positioned as to be alignable with the respective apertures in the partition or outer wall; and means whereby said cap may be rotated so as to selectively bring certain of such openings into alignment with certain of said apertures.

2. A combined salt and pepper dispensing container composed of an outer vertical cylindrical casing open at its top and closed at its bottom and an inner concentric cylindrical partition arranged therein, forming an inner compartment and an outer compartment, said partition extending higher than said casing; dispensing apertures formed in said casing and said partition adjacent the respective upper ends thereof; and a removable cap engaging and closing said compartments, provided with a downward depending flange engaging said partition and a second downward depending flange engaging said casing; said first flange being provided with an opening alignable with the apertures in said partition and said second flange being provided with an opening alignable with the apertures in said casing; and means for rotating said cap relative to said container; said openings in said flanges and said apertures being so positioned with relation to each other that selectively by rotating said cap to one position the opening in said first flange will align with the apertures in said partition and by protating said cap to a second position the opening in the second flange will align with the apertures in said casing.

3. A combined salt and pepper container composed of an outer cylindrical casing and an inner concentric cylindrical partition arranged therein, forming an inner compartment and an outer compartment, said inner partition extending higher than said outer casing; dispensing apertures formed in said casing and said partition adjacent the respective upper ends thereof; and a removable cap engaging and closing said container, provided with an outer vertical wall, an inner downward depending flange engaging said partition, and an outer downward depending flange engaging said outer casing; said cap wall and said inner flange each being provided with openings alignable with the apertures in said inner partition and said outer flange being provided with openings alignable with the apertures in said outer casing, and means for rotating said cap relative to said container; said openings in said flanges, said cap wall and said apertures being so positioned with relation to each other that selectively by rotating said cap one of said inner partition apertures will align with an opening in said inner flange and an opening in said cap wall so as to open a passageway from said inner compartment; by rotating said cap to a second position one of the apertures in said outer casing will align with an opening in said outer flange so as to open a passageway from said outer compartment; and by rotating said cap to a third position one of said inner partition apertures will align with an opening in said inner flange and an opening in said cap wall and an aperture in said outer casing will align with an opening in said outer flange, so as to simultaneously open passageways from both said compartments.

4. A condiment dispensing device comprising a container open at the top; a vertical partition dividing said container into an inner compartment and an outer compartment, said inner compartment extending higher than said outer compartment; discharge apertures in the outer sidewall of each of said compartments adjacent the respective upper edges thereof; a removable cap engaging and closing the open top of said container and rotatable in said engaged position; and openings in said cap selectively registering with the apertures in the side wall of one of said compartments when said cap is rotated to one position, and registering with the apertures in the side wall of the other of said compartments when the cap is rotated to a second position.

References Cited in the file of this patent

UNITED STATES PATENTS

| | | |
|---|---|---|
| 1,219,475 | Norris | Mar. 20, 1917 |
| 1,279,706 | Kaempf | Sept. 24, 1918 |
| 1,833,851 | Olson | Nov. 24, 1931 |
| 2,340,841 | Black | Feb. 1, 1944 |
| 2,514,416 | Plunkett | July 11, 1950 |
| 2,922,551 | Osaka | Jan. 26, 1960 |

FOREIGN PATENTS

| | | |
|---|---|---|
| 587,102 | France | Jan. 12, 1925 |